No. 639,501. Patented Dec. 19, 1899.
O. BARNETT.
SAWHORSE.
(Application filed May 25, 1899.)
(No Model.)
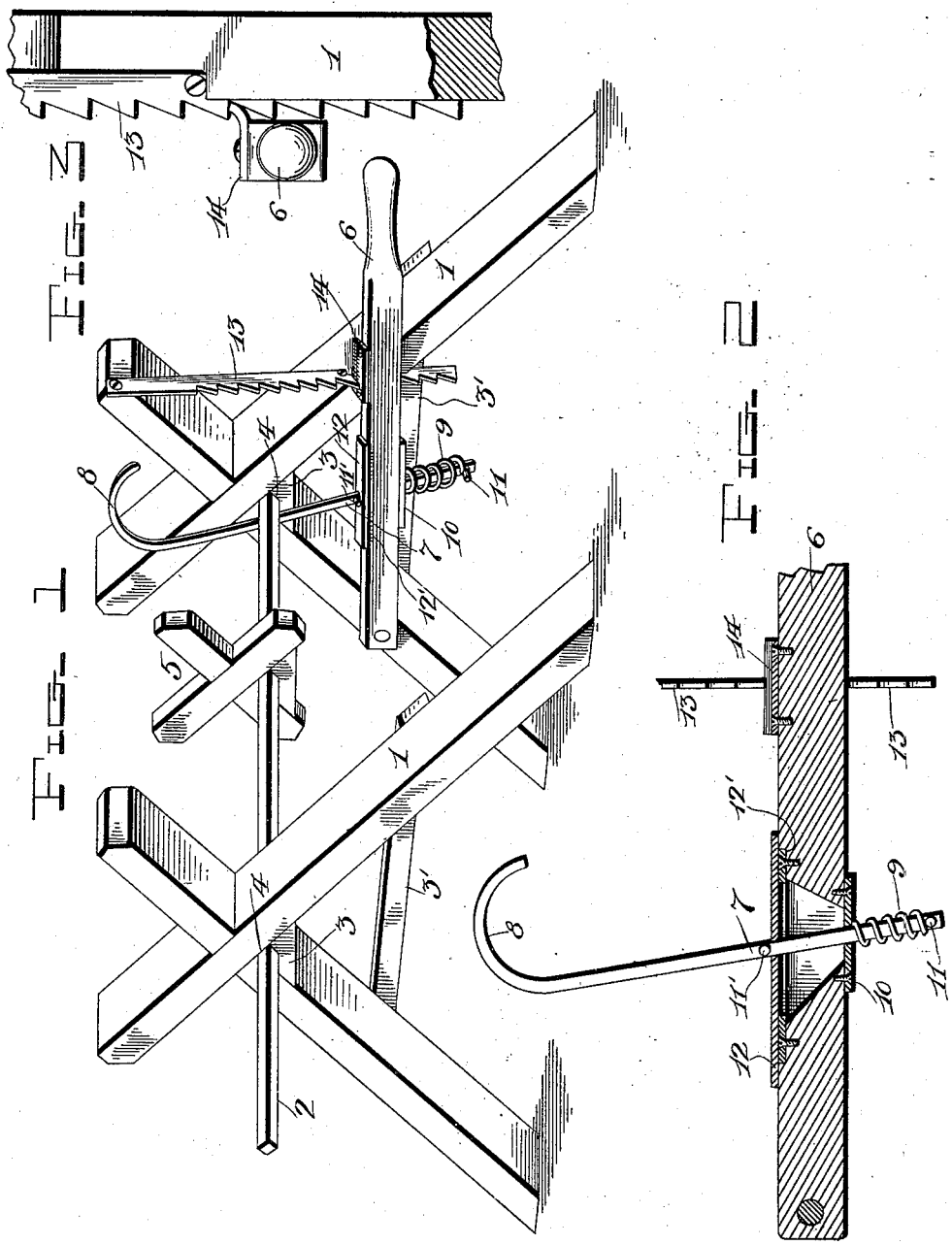
Inventor
Ottaway Barnett,

UNITED STATES PATENT OFFICE.

OTTAWAY BARNETT, OF ROANOKE, VIRGINIA.

SAW-HORSE.

SPECIFICATION forming part of Letters Patent No. 639,501, dated December 19, 1899.

Application filed May 25, 1899. Serial No. 718,189. (No model.)

*To all whom it may concern:*

Be it known that I, OTTAWAY BARNETT, a citizen of the United States, residing at Roanoke, in the county of Roanoke and State of Virginia, have invented certain new and useful Improvements in Saw-Horses; and I do declare the following to be a full, clear, and exact description of the invention, such as will enable others skilled in the art to which it appertains to make and use the same.

The invention has relation to saw-horses.

The object of the invention is to provide a saw-horse with log-supporting members which are made longitudinally adjustable to cut logs of different lengths; furthermore, to provide a saw-horse with a novel clamp which may be easily and quickly operated to firmly secure the log to the horse and prevent it from following the saw in its "up-draw" movement, and, finally, to provide a device of this character which shall be simple of construction, durable in use, and comparatively inexpensive of production.

In the accompanying drawings, Figure 1 is a perspective view of my improved saw-horse. Fig. 2 is a longitudinal sectional view through the clamping-lever and the log-engaging hook. Fig. 3 is an enlarged fragmentary view of the rack-bar and ratchet-plate.

Like numerals of reference indicate like parts in the several views.

1 denotes the X-supports of the horse, which may be of any well-known or approved construction, and 2 its cross-bar. Each support is provided with a triangular piece 3, secured to it and formed with a polygonal aperture 4, through which the cross-bar extends. This construction admits of a longitudinal adjustment of the supports to cut logs of different lengths.

5 denotes a supplemental X-support which is likewise connected to the cross-bar and is arranged between the two larger supports. This additional or supplemental support, however, is not absolutely necessary, although I prefer to employ it in the construction of my improved horse.

6 denotes a lever pivoted to one leg of one of the X-supports and provided intermediate its length with a vertical aperture, which flares outwardly as it approaches the upper surface of the lever. Extending through this aperture is a shank 7 of a hook 8. The lower end of the shank has placed upon it a coil-spring 9, which is confined between a plate 10, secured to the under side of the lever, and a stop-stud 11 in the extreme lower end of the shank.

12 denotes a plate loosely fitted upon the shank above the upper surface of the lever and resting on the upper surface. This plate covers the flaring aperture and prevents sawdust from falling therein and clogging the machine, while at the same time permitting of a free swinging movement of the hook.

11' denotes a stop-pin secured to the shank of the hook and limits the downward movement of the hook.

13 denotes a rack-bar secured to the X-support to which the lever is pivoted and which is adapted to be engaged by a ratchet-plate 14, secured to the upper surface of the lever.

In operation the log or timber to be acted upon is placed in the usual manner upon the horse, with the hook swung over it. Now by depressing the free end of the lever this hook will be forced against the log and will be held in engagement therewith by the energy of the spring, which is sufficient to prevent the log or timber from rotating or moving while being operated upon, but which will yield should the saw stick or bind, thereby preventing any breaking or snapping of the saw.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

1. The combination with a saw-horse, of a lever pivoted to one leg thereof and provided with a flaring aperture, a hook, the shank of which passes through said aperture, and a spring arranged to exert its energy downward to draw the hook in firm engagement with the work to be operated upon, substantially as and for the purpose set forth.

2. The combination with a saw-horse, of a lever pivoted to one leg thereof and provided with a flaring aperture, a hook, the shank of which passes through said aperture, a spring arranged to exert its energy downward to draw the hook in firm engagement with the work to be operated upon, and a plate loosely located upon the shank of said hook to cover
5 the flaring aperture, substantially as and for the purpose set forth.

In testimony whereof I have hereunto set my hand in presence of two subscribing witnesses.

OTTAWAY BARNETT.

Witnesses:
 JAMES R. POURIE,
 W. C. RADER.